(12) United States Patent
Darwood et al.

(10) Patent No.: US 7,792,179 B2
(45) Date of Patent: Sep. 7, 2010

(54) ARRANGEMENT AND METHOD FOR SEQUENCE PRODUCTION IN A SPREAD SPECTRUM COMMUNICATION SYSTEM

(75) Inventors: Peter Bruce Darwood, Crookes (GB); Alan Edward Jones, Derry Hill (GB)

(73) Assignee: IPWireless, Inc., San Francisco, CA (US)

( * ) Notice: Subject to any disclaimer, the term of this patent is extended or adjusted under 35 U.S.C. 154(b) by 933 days.

(21) Appl. No.: 10/532,162

(22) PCT Filed: Nov. 3, 2003

(86) PCT No.: PCT/GB03/04737

§ 371 (c)(1),
(2), (4) Date: Nov. 8, 2005

(87) PCT Pub. No.: WO2004/040817

PCT Pub. Date: May 13, 2004

(65) Prior Publication Data

US 2006/0062185 A1    Mar. 23, 2006

(30) Foreign Application Priority Data

Nov. 1, 2002   (GB) ................. 0225495.1

(51) Int. Cl.
*H04B 1/00*   (2006.01)
(52) U.S. Cl. .............. 375/146; 375/140; 375/141; 370/208; 370/209; 370/342; 370/335
(58) Field of Classification Search ............ 370/335, 370/208–209, 342; 375/140, 141, 146
See application file for complete search history.

(56) References Cited

U.S. PATENT DOCUMENTS

| 5,559,829 | A |   | 9/1996 | Le Strat et al. |
| 5,742,678 | A | * | 4/1998 | Dent et al. ............ 380/270 |
| 6,366,566 | B1 |   | 4/2002 | Scott |

(Continued)

FOREIGN PATENT DOCUMENTS

CA    2276971    1/2001

(Continued)

OTHER PUBLICATIONS

"Design of Cyclically permutable Codes for PN code acquisition in WCDMA TDD Mode"; Hosur; VCT 2000; pp. 582-585.*

(Continued)

*Primary Examiner*—Vincent P Harper
*Assistant Examiner*—Dung Lam
(74) *Attorney, Agent, or Firm*—Fitch Even Tabin & Flannery (57) ABSTRACT

An efficient scheme for CDMA coding constructs codes by generating longer code sequences (430) via concatenation, from an existing set of short sequences (410, 420). The sequences may be spreading, scrambling and or training or channel estimation (such as midamble) sequences. The invention allows extension of sequences without performing an exhaustive search for sequences with optimal desired properties, as well as extension of the sequence duration to improve the detection of wanted signals via the use of a conventional matched filter, a multi-user detector or an adaptive filter/equaliser.

63 Claims, 4 Drawing Sheets

U.S. PATENT DOCUMENTS

| | | | |
|---|---|---|---|
| 7,162,541 | B2 | 1/2007 | Koo et al. |
| 2002/0031082 | A1 | 3/2002 | Lundby et al. |
| 2002/0122463 | A1* | 9/2002 | Li .............................. 375/140 |
| 2002/0136171 | A1 | 9/2002 | Mennekens et al. |

FOREIGN PATENT DOCUMENTS

| | | |
|---|---|---|
| EP | 1 063 780 A2 | 12/2000 |
| EP | 1 063 780 A3 | 12/2000 |
| GB | 2394867 A | 5/2004 |
| WO | WO-97/44980 A1 | 11/1997 |

OTHER PUBLICATIONS

3GPP Spreding and Modulation (FDD), TS 25.213 V3.11; Dec. 1990; p. 21-23.*

3GPP (Jan. 2002). "3rd Generation Partnership Project; Technical Specification Group Services and System Aspects; General Packet Radio Service (GPRS); Service Description; Stage 2 (Release 1999)," *3GPP* TS 23.060, V3.10.0, pp. 1-192.

3GPP (Mar. 2002). "3rd Generation Partnership Project; Technical Specification Group Radio Access Network; Spreading and Modulation (TDD) (Release 1999)," *3GPP* TS 25.223 V3.8.0 pp. 1-20.

Hosur, S. et al. (Sep. 24-28, 2000). "Design of Cyclically Permutable Codes for PN Code Acquisition in WCDMA TDD Mode," *IEEE VTC Fall VTC 2000 52nd Vehicular Technology Conference* Boston, MA IEEE Cat. No. 00CH37152, pp. 581-587.

Elders-Boll, H. at al. (Sep. 1996). "Interference Parameters of Concatenated Spreading Sequences for Asynchronous CDMA," *IEEE 4th International Symposium on Spread Spectrum Techniques and Applications* 3:22-25.

Great Britain Examination Report mailed Oct. 25, 2004, for Great Britain Application No. 0225495.1 filed Nov. 1, 2002, 2 pages.

Great Britain Search Report mailed Mar. 5, 2003, for Great Britain Application No. 0225495.1 filed Nov. 1, 2002, 2 pages.

International Search Report mailed Feb. 24, 2004, for PCT Application No. PCT/GB03/04737 filed Nov. 3, 2003, 3 pages.

* cited by examiner

ARRANGEMENT AND METHOD FOR SEQUENCE PRODUCTION IN A SPREAD SPECTRUM COMMUNICATION SYSTEM

FIELD OF THE INVENTION

This invention relates to spread spectrum communication systems, and particularly (though not exclusively) to direct sequence (DS) spread spectrum wireless communication systems.

BACKGROUND OF THE INVENTION

In DS spread spectrum communications such as in code division multiple access (CDMA) systems, a signal for transmission is spread in the frequency domain. Thus the same information is transmitted over a different (larger) bandwidth, affording some level of diversity in the frequency domain. The benefits of such a communications method are that the transmitted signal is more resilient to band limited interference and frequency selective fading.

The spreading of a signal is achieved by modulating each symbol, or each set of consecutive symbols, of the transmission signal by a sequence or code that varies at a faster rate than that of the transmission signal. Typically in DS-CDMA systems the spreading waveforms are selected from a long pseudo random sequence, or if short enough they can be chosen according to some optimality criteria. Whilst longer sequences are desirable due to their superior correlation properties, shorter sequences are typically employed due to the resulting ease of implementation of both transmitter and receiver algorithms and associated hardware. As an example of a method for the design of short sequences, but not restricted to this method, the sequences may be chosen such that they exhibit good auto-correlation properties or such that pairs of sequences exhibit favourable cross-correlation properties. This typically requires a search over all possible sequences of the desired length to select the sequences with the desired attributes. For each new spreading length required, a new search is required for sequences that satisfy the desired optimality criteria.

However, this approach has the disadvantage(s) that, since good spreading waveform sequences require a search over all possible sequences of a desired length to select the sequences with the desired attributes, and since for each new spreading length required a new search is required for sequences that satisfy the desired optimality criteria, longer sequence lengths are inefficient to design.

A need therefore exists for efficient spread spectrum code construction wherein the abovementioned disadvantage(s) may be alleviated.

STATEMENT OF INVENTION

In accordance with a first aspect of the present invention there is provided an arrangement, for producing a sequence of a predetermined length in a spread spectrum communication system, as claimed in claim 1.

In accordance with a second aspect of the present invention there is provided a method, of producing a sequence of a predetermined length in a spread spectrum communication system, as claimed in claim 12.

The invention allows efficient generation of longer sequences from shorter ones. This has the advantage of alleviating the need for an extensive search of sequences of the desired length and allows the simple re-use of existing hardware. The invention is suitable for any purposes where a set of sequences are used to derive a set of extended sequences with longer duration than the original sequences. The invention is applicable to TD-CDMA systems, and in particular the various chip rates of the TDD mode of UTRA. The reader will appreciate that this method is applicable to, but not restricted to, generating extended length spreading sequences, scrambling sequences and channel estimation sequences or midambles.

BRIEF DESCRIPTION OF THE DRAWINGS(S)

Two efficient CDMA code construction schemes incorporating the present invention will now be described, by way of example only, with reference to the accompanying drawings, in which.

DESCRIPTION OF PREFERRED EMBODIMENTS

Figure 1:
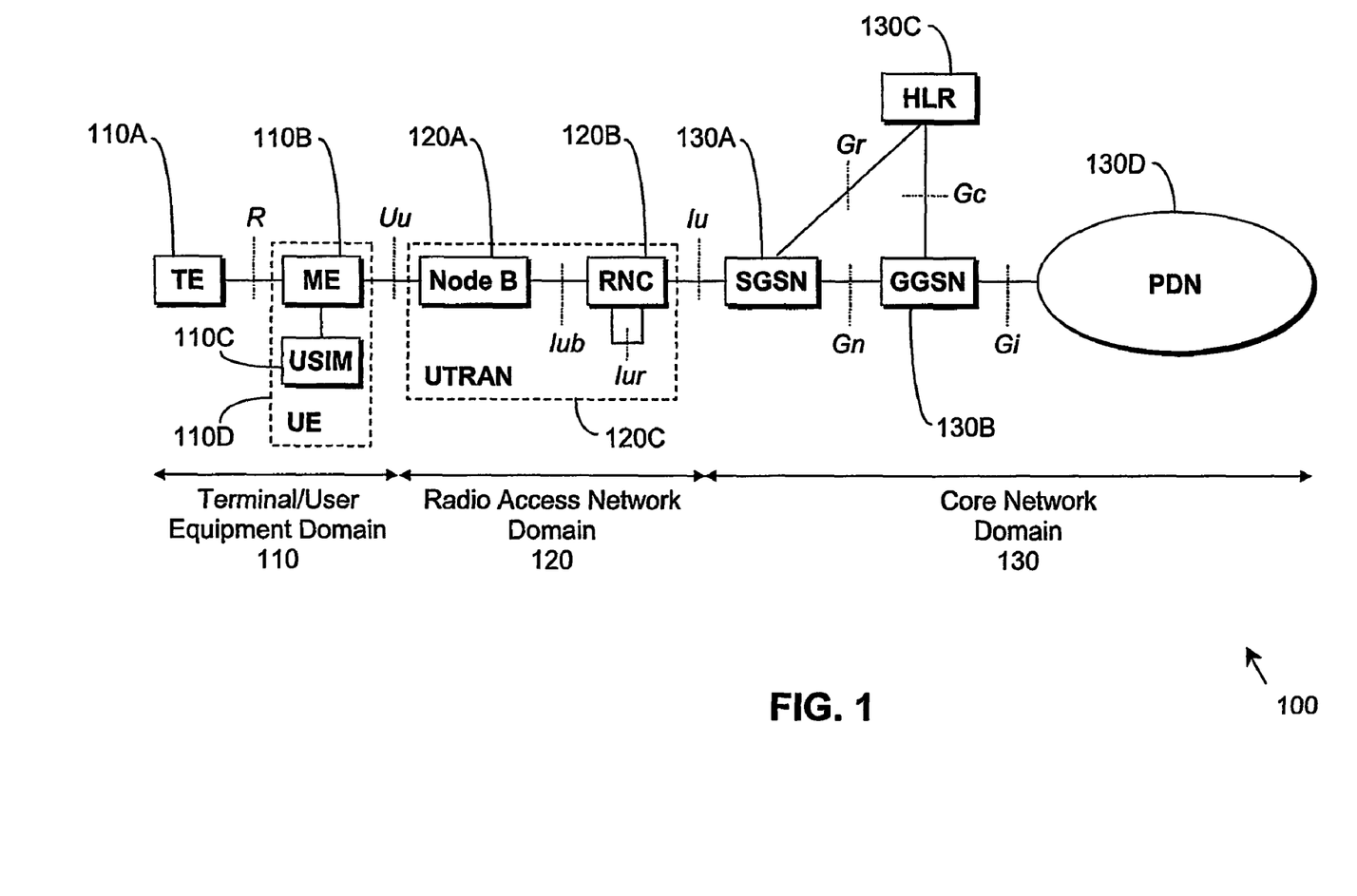
FIG. 1 shows a block schematic diagram illustrating a 3GPP UTRA radio communication system in which the present invention may be used.

Referring firstly to FIG. 1, a typical, standard UMTS Radio Access Network (UTRAN) system 100 is conveniently considered as comprising: a terminal/user equipment domain 110; a UMTS Terrestrial Radio Access Network domain 120; and an infrastructure domain 130.

In the terminal/user equipment domain 110, terminal equipment (TE) 110A is connected to user mobile equipment (ME) 110B via the wired or wireless R interface. The ME 110B is also connected to a user service identity module (USIM) 110C; the ME 110B and the USIM 110C together are considered as a user equipment (UE) 110D. The UE 110D communicates data with a Node B (base station) 120A in the radio access network domain (120) via the wireless Uu interface. Within the network radio access network domain 120, the Node B 120A communicates with a radio network controller (RNC) 120B via the Iub interface. The RNC 120B communicates with other RNC's (not shown) via the Iur interface. The Node B 120A and the RNC 120B together form the UTRAN 120C The RNC 120B communicates with a serving GPRS service node (SGSN) 130A in the core network domain 130 via the Iu interface. Within the core network domain 130, the SGSN 130A communicates with a gateway GPRS support node 130B via the Gn interface; the SGSN 130A and the GGSN 130B communicate with a home location register (HLR) server 130C via the Gr interface and the Gc interface respectively. The GGSN 130B communicates with public data network 130D via the Gi interface.

Thus, the elements RNC 120B, SGSN 130A and GGSN 130B are conventionally provided as discrete and separate units (on their own respective software/hardware platforms) divided across the radio access network domain (120) and the core network domain (130), as shown in FIG. 1.

The RNC 120B is the UTRAN element responsible for the control and allocation of resources for numerous Node B's 120A; typically 50 to 100 Node B's may be controlled by one RNC. The RNC also provides reliable delivery of user traffic over the air interfaces. RNC's communicate with each other (via the Iur interface) to support handover.

The SGSN 130A is the UMTS Core Network element responsible for Session Control and interface to the HLR. The SGSN keeps track of the location of an individual UE and performs security functions and access control. The SGSN is a large centralised controller for many RNCs.

The GGSN 130B is the UMTS Core Network element responsible for concentrating and tunnelling user data within the core packet network to the ultimate destination (e.g., internet service provider—ISP).

Such a UTRAN system and its operation are described more fully in the 3rd Generation Partnership Project technical specification document 3GPP TS 23.060, and related documents, available from the 3GPP website at www.3gpp.org, and need not be described herein in more detail.

Figure 2:
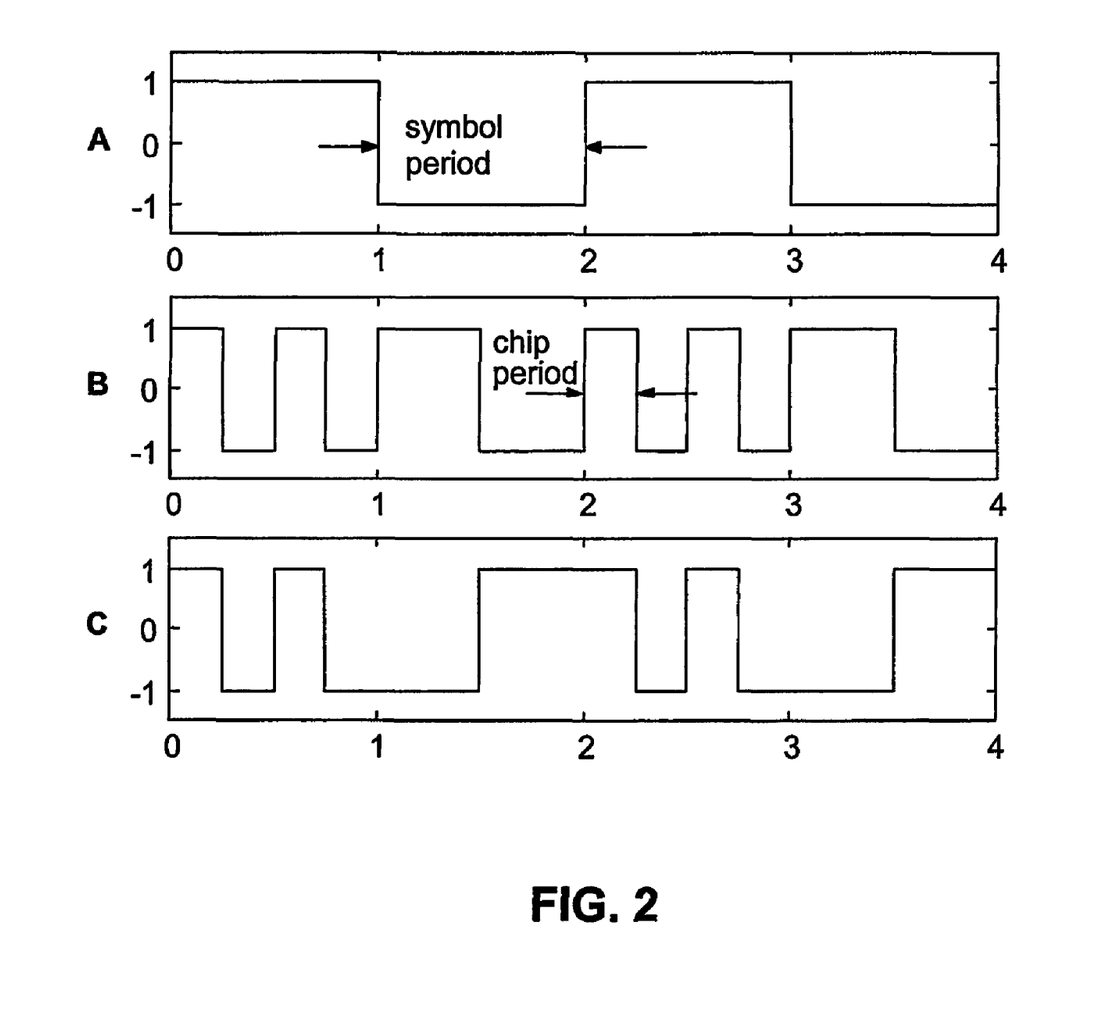
FIG. 2 shows a schematic diagram illustrating spreading of data symbols in direct sequence spread spectrum.

In time division code division multiple access (TD-CDMA) systems, such as the time division duplex (TDD) mode of UMTS Terrestrial Radio Access (UTRA), the spreading waveforms can be thought of as a combination of channelisation codes and scrambling codes and are typically short and periodic, such that each symbol or set of consecutive symbols is modulated by the same spreading waveform. For example, in FIG. 2 the data symbols are grouped into pairs and modulated by a spreading sequence of duration 8 chips in order to form the output sequence (it should be noted that the symbol and spreading sequences are not restricted to have values from the set $\{-1,+1\}$). FIG. 2A shows a waveform of data symbols; FIG. 2B shows a waveform of the spreading sequence; and FIG. 2C shows a waveform of spread symbols resulting from spreading of the data symbols of FIG. 2A by the spreading sequence of FIG. 2B. The choice of short and periodic spreading sequences in this case is principally due to the implementation advantages gained in the receiver. For instance, many multi-user or joint detection algorithms and or adaptive filter implementations are sensitive to the length and/or periodicity of the spreading sequences.

More specifically, in the high chip rate (3.84 mega chips per second) mode of UTRA TDD the scrambling code is a sequence of length 16 chips selected from a list of 128 possible sequences according to the initial cell parameter assignment and the current system frame number. In frames with an even system frame number, the scrambling code is equal to the initial cell parameter assignment. In frames with an odd system frame number, the scrambling code is selected as the initial cell parameter assignment plus 1 if the initial cell parameter assignment is even and as the initial cell parameter assignment minus 1 if the initial cell parameter assignment is odd. The scrambling code may span either 1, 2, 4, 8 or 16 symbols depending upon the channelisation code employed. Thus in this system the spreading code can be viewed as composite of the channelisation code and the scrambling code.

The spreading of signals in a 3GPP TDD system is described in detail in the 3GPP technical specification document 3GPP TS 25.223, 'Spreading and Modulation (TDD)', available from the 3GPP website at www.3gpp.org, and need not be described herein in more detail.

As will be described in more detail below, the present invention is based on a flexible approach (alternative to the prior art approach described above) for the generation of longer sequences from short ones by concatenating two or more short sequences according to the desired length of the new sequences. Whilst the new extended sequences may not necessarily be optimal with respect to any of the usual criteria such as auto- or cross-correlation properties they have the distinct advantage that they re-use an existing set of sequences that can be extended for other applications. The method's simplicity alleviates the need for a new and exhaustive search for sequences of the desired length and allows the re-use of existing hardware for the new application, i.e., instead of storing or implementing hardware/software for the generation of the new sequences, a simple algorithm may be implemented that uses the existing hardware/software for the generation of short sequences.

The number of short sequences used in the concatenation is dependent upon the desired length of the new sequences. The choice of sequences for concatenation may be flexible and may be chosen according to a simple set of design rules. For instance, if a set of N short sequences exists, each time a longer sequence is required an initial index into N of n is selected (according to some rules). Then according to the desired length of the new sequences concatenation may, for example, be produced from: short sequence n and n+1 (for a doubling of sequence length), or n, n+1, n+2 (for a tripling of sequence length) and n, n+1, n+2, n+3 for a quadrupling of sequence length. If at any point the index n+x (for some x) exceeds the number of short sequences N the index may be wrapped round to the beginning of the list of short codes; thus (n+x) modulo N is used as the index into the list of short sequences where the index into the list of short sequences runs from 0 to N−1.

It may of course be understood that in choosing the short sequences for concatenation it is not necessary for the index to be incremented by 1 each time. It may in fact be incremented by any integer, including 0. For instance, in doubling the sequence length short codes n and n+y (where $y \geq 1$) may be concatenated. Thus, for the tripling of the sequence length short sequences n, n+y, n+2y may be concatenated, and for the quadrupling of the sequence length short sequences n, n+y, n+2y, n+3y may be concatenated. It may further be understood that the incremental index is not restricted to being regular and could in fact be random. For instance a tripling of sequence length may be chosen by the concatenation of short sequences n, n+y, n+z where z is not necessarily equal to a multiple of y.

As described above, the spreading sequence extension scheme requires two mechanisms in order to operate:

1. A set of existing short spreading sequences.
2. An algorithm for selecting a number of the short spreading sequences from the set, in order that they may be concatenated to form a longer spreading sequence.

As will be appreciated, the sequence extension scheme may be utilised in the UE and/or Node B in order to generate sequences that may be used for amongst other purposes to spread data with the generated codes, or scramble data with the generated codes or used as extended channel estimation sequences.

As a more specific example of the method, but not restricted to this case, the length of scrambling sequences specified in the UTRA high chip rate TDD mode may be extended. Such an extension could be applied to the specified chip rate or may be required for instance if the TDD mode were to be operated at a multiple of the chip rate in the current specification. Extending the length of the scrambling codes in this scenario improves the correlation properties and hence aids in the detection of the wanted signals. Whilst the scrambling code length has been extended by concatenation, it will remain short relative to the length of the burst and also remain periodic (albeit over a potentially larger number of symbols). This means that receiver algorithms such as adaptive filters and reduced complexity multi-user detectors that rely on these properties will be able to operate.

Figure 3:
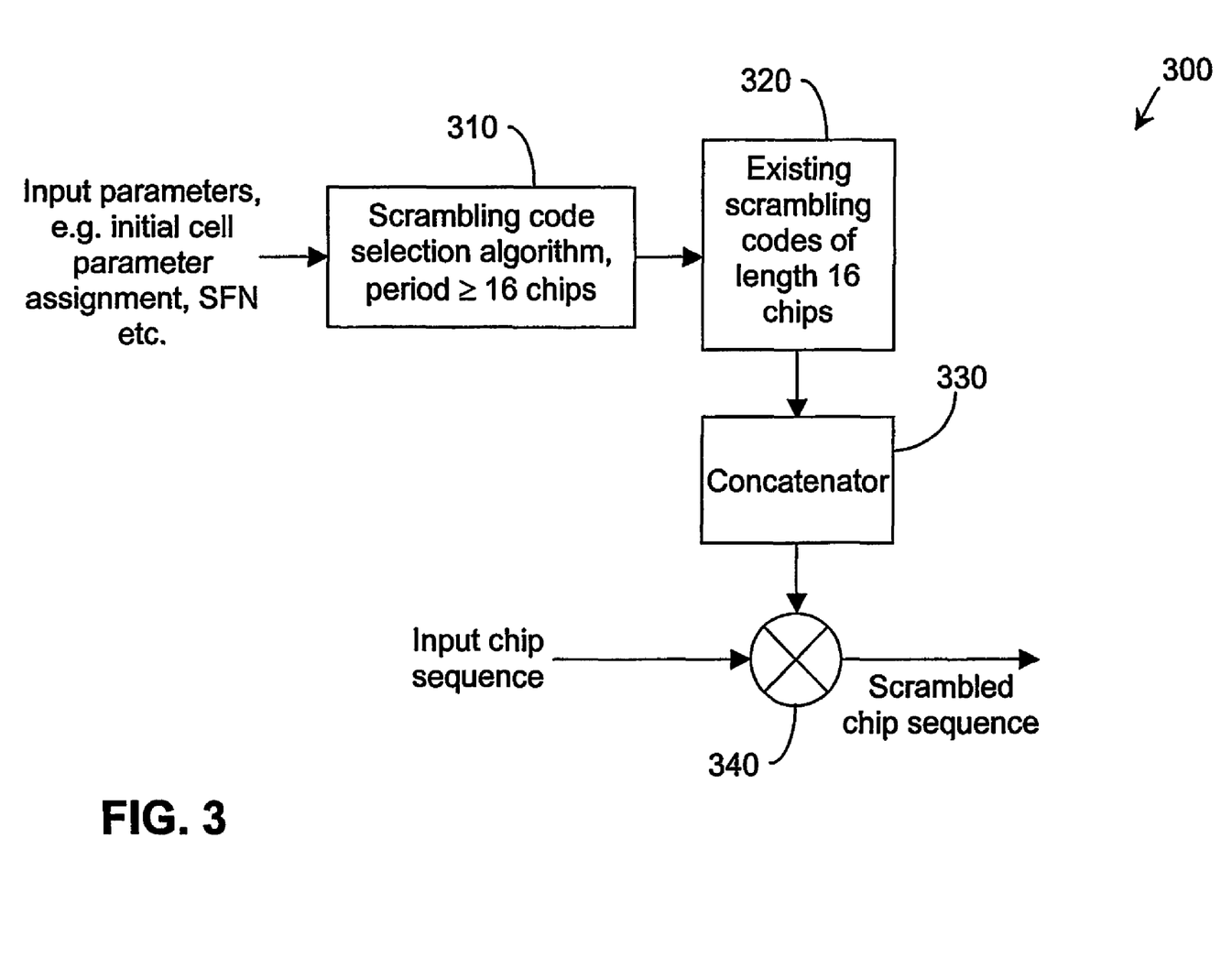
FIG. 3 shows a block schematic diagram illustrating an arrangement for concatenation of scrambling codes in UTRA TDD mode incorporating the present invention.

In FIG. 3 a spreading arrangement 300 in accordance with a preferred embodiment of the present invention is shown. In the arrangement 300 a scrambling code selection algorithm 310 receives input parameters such as initial cell parameter assignment, SFN, etc. The scrambling code selection algorithm 310 selects scrambling codes from a set of existing short sequences 320. The selected scrambling codes are concatenated in concatenator 330 and the resultant concatenated sequence is applied to multiplier 340, to which an input chip sequence is also applied, to produce a scrambled chip sequence. It will be appreciated that the concatenator 330 may function simply to sequentially apply each of the selected sequences.

In the current standardisation of 3GPP TDD the scrambling code selection algorithm remains constant over the duration of the burst, i.e., every 16 chips in a burst the same scrambling code is selected. In this preferred embodiment of the invention the period of this algorithm is increased to a multiple of 16 chips, i.e., 1, 2, 3, 4, etc. Thus, if the initial scrambling code selection is n an algorithm may be used with a period 4 which selects the scrambling codes of length 16 chips as follows during the course of the burst:

(n, n+1, n+2, n+3, n, n+1, n+2, n+3, n, n+1, n+2, n+3, ...)

However as mentioned above, the algorithm is not restricted to incrementing the scrambling code index by 1 each time, for instance another embodiment of the invention would be to select the length 16 chip scrambling codes as follows during the course of the burst:

(n, n+2, n+4, n+6, n, n+2, n+4, n+6, n, n+2, n+4, n+6, ...)

Thus an important feature of this embodiment is the extension of the scrambling code duration via the concatenation of the existing scrambling codes of length 16 chips. Alternatively, this can be viewed as extending the period of the scrambling code selection algorithm in FIG. 3.

The scrambling code selection algorithm as illustrated in FIG. 3 can be driven by a number of input parameters. These parameters could include some or all of the following, but should not be restricted to this list:

1. Initial cell parameter assignment
2. System frame number (SFN)
3. Chip rate of transmission
4. Length of extended spreading and or scrambling sequence
5. A User Equipment (UE) identifier
6. Channelisation code employed.

It will be appreciated that the method of producing a sequence described above may be carried out in software running on a processor (not shown) in a base station (Node B) or UE, and that the software may be provided as a computer program element carried on any suitable data carrier (also not shown) such as a magnetic or optical computer disc.

It will be also be appreciated that the method of producing a sequence described above may alternatively be carried out in hardware, for example in the form of an integrated circuit (not shown) such as an FPGA (Field Programmable Gate Array) or ASIC (Application Specific Integrated Circuit) in the Node B or UE.

It will further be understood that the efficient CDMA sequence construction scheme described above may be applied to any sequence, such as a spreading sequence, a scrambling sequence or a channel estimation or training sequence (e.g., a midamble).

Figure 4:
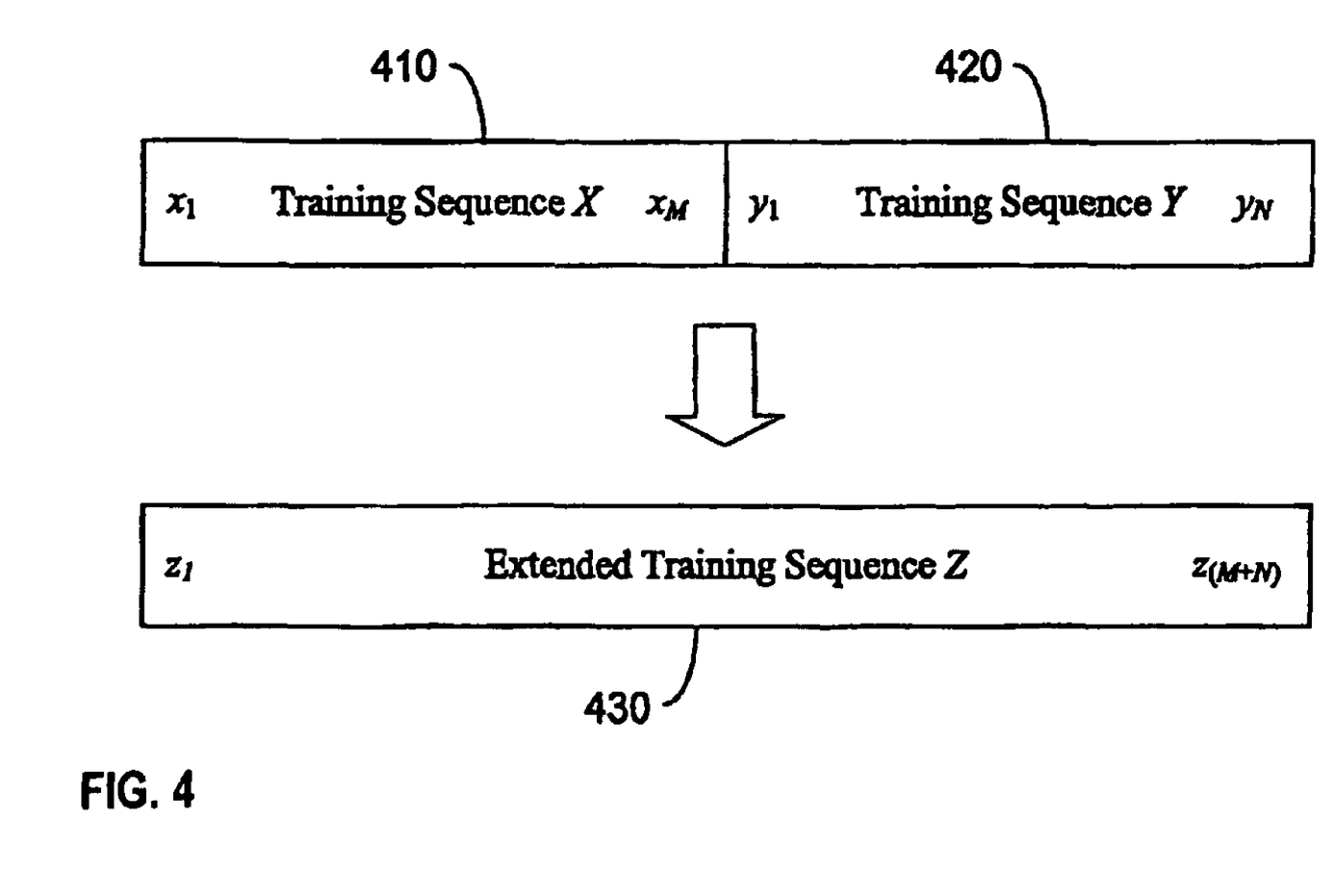
FIG. 4 shows a block schematic diagram illustrating generation of an extended training code (such as a midamble) by concatenation of shorter training codes.

Referring now also to FIG. 4, a second preferred embodiment of the present invention relates to the concatenation of training sequences for the purpose of channel estimation. As shown in FIG. 4, a training sequence X 410 of length M is concatenated with another training sequence Y 420 of length N to form a new training sequence Z 430 of length M+N. It will of course be appreciated that training sequence X may be the same as training sequence Y and that the concatenation is not restricted to two existing training sequences but rather any positive integer number of channel estimation or training sequences.

Training sequences may be concatenated to produce longer or extended training sequences resulting in an improved carrier to interference (C/I) ratio (where interference is taken as including interference and background noise) at the output of the channel estimator. Obviously the benefits of using existing shorter training sequences and concatenating them to form longer ones still apply in terms of simplicity of design and reuse of existing hardware, software, ROM etc.

It will be understood that the method is not restricted to the concatenation of two training sequences but rather any number of training sequences. Furthermore it will be understood that the some or all of the training sequences used for concatenation may be the same as each other. In the case where the training sequences are identical soft combining on the output of the channel estimator is performed in order to realise the additional gain in C/I.

A further point to note is that the entire length of the existing training sequences may not necessarily be used in the concatenation process. For instance, if the training sequence comprises a base sequence which is periodically extended, the base sequences may be used as the existing training sequences for concatenation.

It will be understood that the efficient CDMA sequence construction scheme described above provides the following advantages:

allows extension of sequences without performing an exhaustive search for sequences with optimal desired properties.

provides a simple means of extending the sequence duration that is able to re-use the existing hardware/software/ROM, etc., and only requires the addition of a simple programmable or fixed selection algorithm.

extends the sequence duration to improve the detection of wanted signals via the use of a conventional matched filter, a multi-user detector or an adaptive filter/equaliser.

The invention claimed is:

1. An apparatus for producing a sequence of a predetermined length in a spread spectrum communication system, comprising:

means for storing a plurality of predetermined sequences having lengths less than the predetermined length;

means for arranging the plurality of predetermined sequences in an indexed list;

means for selecting at least two of the plurality of predetermined sequences from the indexed list; and means for concatenating the selected predetermined sequences to produce the sequence of the predetermined length, wherein the means for selecting comprises:

means for selecting a first sequence of the at least two of the plurality of predetermined sequences with an index value of n from the indexed list, and means for selecting each successive sequence of the at least two of the plurality of predetermined sequences with an index value incremented from that of the previously selected sequence from the indexed list, and wherein n is determined from at least one of A-F:
A initial cell parameter assignment,
B system frame number (SFN),
C chip rate of transmission,
D predetermined length of scrambling code,
E identifier of intended receiver of data spread with the predetermined length spreading code, and
F channelisation code employed.

2. The apparatus of claim 1 wherein the increment is a predetermined integer.

3. The apparatus of claim 2 wherein the predetermined integer is one of: 0, 1 and 2.

4. The apparatus of claim 3 wherein the plurality of predetermined sequences has a length of 16 chips.

5. The apparatus of claim 3 wherein the spread spectrum communication system comprises a DS-CDMA UMTS system.

6. The apparatus of claim 3 wherein the sequence is one of:
a spreading sequence,
a scrambling sequence and
a midamble.

7. The apparatus of claim 3 further comprising:
means for processing data with the predetermined length sequence.

8. The apparatus of claim 2 wherein the plurality of predetermined sequences has a length of 16 chips.

9. The apparatus of claim 2 wherein the spread spectrum communication system comprises a DS-CDMA UMTS system.

10. The apparatus of claim 2 wherein the sequence is one of:
a spreading sequence,
a scrambling sequence and
a midamble.

11. The apparatus of claim 2 further comprising:
means for processing data with the predetermined length sequence.

12. The apparatus of claim 1 wherein the increment is randomly chosen for each successive sequence.

13. The apparatus of claim 12 wherein the plurality of predetermined sequences has a length of 16 chips.

14. The apparatus of claim 12 wherein the spread spectrum communication system comprises a DS-CDMA UMTS system.

15. The apparatus of claim 12 wherein the sequence is one of:
a spreading sequence,
a scrambling sequence and
a midamble.

16. The apparatus of claim 12 further comprising:
means for processing data with the predetermined length sequence.

17. The apparatus of claim 1 wherein the plurality of predetermined sequences have a length of 16 chips.

18. The apparatus of claim 17 wherein the spread spectrum communication system comprises a DS-CDMA UMTS system.

19. The apparatus of claim 17 wherein the sequence is one of:
a spreading sequence,
a scrambling sequence and
a midamble.

20. The apparatus of claim 17 further comprising:
means for processing data with the predetermined length sequence.

21. The apparatus of claim 1 wherein the spread spectrum communication system comprises a DS-CDMA UMTS system.

22. The apparatus of claim 21 wherein the system comprises a UTRA TDD system.

23. The apparatus of claim 22 further comprising:
means for processing data with the predetermined length sequence.

24. The apparatus of claim 21 wherein the sequence is one of:
a spreading sequence,
a scrambling sequence and
a midamble.

25. The apparatus of claim 21 further comprising:
means for processing data with the predetermined length sequence.

26. The apparatus of claim 1 wherein the sequence is one of:
a spreading sequence,
a scrambling sequence and
a midamble.

27. The apparatus of claim 1 further comprising:
means for processing data with the predetermined length sequence.

28. A base station for use in a CDMA system, the base station comprising the apparatus of any one of claims 1,2,3,12,17,21,22,26,27.

29. User equipment for use in a CDMA system, the user equipment comprising the apparatus of any one of claims 1,2,3,12,17,21,22,26,27.

30. The apparatus of claim 1 wherein the plurality of predetermined sequences has a length of 16 chips.

31. The apparatus of claim 1 wherein the spread spectrum communication system comprises a DS-CDMA UMTS system.

32. The apparatus of claim 1 wherein the sequence is one of:
a spreading sequence,
a scrambling sequence and
a midamble.

33. The apparatus of claim 1 further comprising:
means for processing data with the predetermined length sequence.

34. The apparatus of claim 1, wherein a first of the selected predetermined sequences comprises a length M and a second of the selected predetermined sequences comprises a length N.

35. The apparatus of claim 34, wherein M equals N.

36. The apparatus of claim 34, wherein M is not equal to N.

37. A method of producing a sequence of a predetermined length in a spread spectrum communication system, the method comprising:
storing a plurality of predetermined sequences having lengths less than the predetermined length;
arranging the plurality of predetermined sequences in an indexed list;
selecting at least two of the plurality of predetermined sequences from the indexed list; and
concatenating, by a processor, the selected predetermined sequences to produce the sequence of the predetermined length,
wherein selecting comprises:
selecting a first sequence of the at least two of the plurality of predetermined sequences with an index value of n from the indexed list, and
selecting each successive sequence of the at least two of the plurality of predetermined sequences with an index value incremented from that of the previously selected sequence from the indexed list, and
wherein n is determined from at least one of A-F:
A initial cell parameter assignment,
B system frame number (SFN),
C chip rate of transmission,
D predetermined length of scrambling code,
E identifier of intended receiver of data spread with the predetermined length spreading code, and
F channelisation code employed.

38. The method of claim 37 wherein the increment is a predetermined integer.

39. The method of claim 38 wherein the increment is one of: 0, 1 and 2.

40. The method of claim 39 wherein the plurality of predetermined sequences have a length of 16 chips.

41. The method of claim 39 wherein the spread spectrum communication system comprises a DS-CDMA UMTS system.

42. The method of claim 39 further comprising:
processing data with the predetermined length sequence.

43. The method of claim 38 wherein the plurality of predetermined sequences have a length of 16 chips.

44. The method of claim 38 wherein the spread spectrum communication system comprises a DS-CDMA UMTS system.

45. The method of claim 38 further comprising:
processing data with the predetermined length sequence.

46. The method of claim 37 wherein the increment is randomly chosen for each successive sequence.

47. The method of claim 46 wherein the plurality of predetermined sequences have a length of 16 chips.

48. The method of claim 46 wherein the spread spectrum communication system comprises a DS-CDMA UMTS system.

49. The method of claim 46 further comprising:
processing data with the predetermined length sequence.

50. The method of claim 37 wherein the plurality of predetermined sequences have a length of 16 chips.

51. The method of claim 50 further comprising:
processing data with the predetermined length sequence.

52. The method of claim 37 wherein the spread spectrum communication system comprises a DS-CDMA UMTS system.

53. The method of claim 52 wherein the UMTS system comprises a UTRA TDD system.

54. The method of claim 53 further comprising:
processing data with the predetermined length sequence.

55. The method of claim 52 further comprising:
processing data with the predetermined length sequence.

56. The method of claim 37 further comprising:
processing data with the predetermined length sequence.

57. A computer-readable storage medium containing computer-executable instructions for performing the method of any one of claims 1,2,3,12,17,21,22,26,27.

58. The method of claim 37 wherein the plurality of predetermined sequences have a length of 16 chips.

59. The method of claim 37 wherein the spread spectrum communication system comprises a DS-CDMA UMTS system.

60. The method of claim 37 further comprising:
processing data with the predetermined length sequence.

61. The method of claim 37, wherein a first of the selected predetermined sequences comprises a length M and a second of the selected predetermined sequences comprises a length N.

62. The method of claim 61, wherein M equals N.

63. The method of claim 61, wherein M is not equal to N.

* * * * *

UNITED STATES PATENT AND TRADEMARK OFFICE
CERTIFICATE OF CORRECTION

| | | |
|---|---|---|
| PATENT NO. | : 7,792,179 B2 | Page 1 of 1 |
| APPLICATION NO. | : 10/532162 | |
| DATED | : September 7, 2010 | |
| INVENTOR(S) | : Peter Bruce Darwood and Alan Edward Jones | |

It is certified that error appears in the above-identified patent and that said Letters Patent is hereby corrected as shown below:

IN THE CLAIMS:

Column 10, Claim 57, Line 20: Change "claims 1,2,3,12,17,21,22,26,27" to -- claims 37, 38, 39, 46, 50, 52, 53, 56 --

Signed and Sealed this
Twenty-ninth Day of March, 2011

David J. Kappos
*Director of the United States Patent and Trademark Office*